United States Patent [19]

Owen et al.

[11] Patent Number: 4,636,277

[45] Date of Patent: Jan. 13, 1987

[54] TIRE BUILDING DRUM

[75] Inventors: Michael E. Owen, Tettenhall, United Kingdom; Mark S. Byerley, Greenback, Tenn.

[73] Assignee: Wyko Equipment Limited, Dudley, England

[21] Appl. No.: 698,536

[22] Filed: Feb. 5, 1985

[30] Foreign Application Priority Data

Feb. 8, 1984 [GB] United Kingdom ............... 8403351

[51] Int. Cl.$^4$ .......................................... B29D 30/26
[52] U.S. Cl. .................................... 156/417; 156/420
[58] Field of Search ............... 156/414, 417, 418, 419, 156/420

[56] References Cited

U.S. PATENT DOCUMENTS 3,485,700 12/1969 Cooper et al. ...................... 156/417
3,779,835 12/1973 Lohr et al. ........................... 156/417
3,785,894 1/1974 Ling et al. ........................... 156/417

Primary Examiner—Lois E. Boland
Attorney, Agent, or Firm—Holman & Stern

[57] ABSTRACT

A radial collapse tire building drum having a hub, a plurality of axially extending cylindrical body segments disposed around the hub, a first radial support at one axial end of the hub and supporting one axial end of the segments, a second radial support at the other axial end of the hub and supporting the other axial ends of the segments, and a collapsing mechanism disposed within the drum between the first and second radial supports and operable to move the segments either radially outwardly with respect to the hub to form a cylindrical body concentric with the hub, or radially inwardly towards the hub to collapse the cylindrical body of the drum. A main drive shaft is secured to the hub with its axis co-extensive with the hub axis and there is a hollow shaft through which the main drive shaft extends. A drive transmission extends between the circumferentially adjacent, radially extending supports of the first radial support means to provide a drive connection between the hollow shaft and the collapsing mechanism for transmitting rotational movement of the hollow shaft relative to the main shaft to operate the collapsing mechanism.

19 Claims, 5 Drawing Figures

TIRE BUILDING DRUM

BACKGROUND OF THE INVENTION

1. Field of the Invention

This invention relates to a tire building drum of the radial collapsing type, for use in the manufacture of pneumatic tires primarily for road vehicles.

2. Description of the Prior Art

Tire building drums have a cylindrical body, rotatable about its axis and upon the cylindrical surface of which tire carcasses are assembled. In order to facilitate removal of constructed carcasses from the drum the cylindrical body of the drum is collapsible. Tire building drums generally fall into either of two categories known respectively as rotary (or inertia) collapse drums and radial collapse drums.

The cylindrical body of a tire building drum is formed in a number of axially extending segments and in the rotary collapse drum the segments are connected by means of pivoting links to a hub, pivoting of the links generating collapsing or expanding movement of the segments. In the radial collapse drum the segments are supported on radially extending pillars or slides, and during collapsing and expanding movement of the segments the segments are moved radially, by operation of a collapsing mechanism with respect to the rotational axis of the drum.

Both types of drum have a main shaft by means of which the drum is mounted, and through which rotational movement is transmitted to the drum. In the rotary collapse drum the arrangement of pivoting links lends itself readily to the provision of a hollow outer shaft through which the main shaft passes, the hollow outer shaft being coupled to the collapsing mechanism of the drum so that relative rotation between the outer hollow shaft and the main shaft operates the collapsing mechanism either to collapse, or expand the segments of the drum. In the radial collapse drum however the internal structure necessitates, in order to achieve a firm and accurate support of the segments, a hub having parts adjacent each axial end of the segments by means of which the segments are supported. The collapsing mechanism is disposed between the two hub portions, and in order to transmit movement to the collapsing mechanism in the radial collapse drum the main shaft and hub are hollow and receive an inner shaft which is connected to the collapsing mechanism by way of a radial aperture in the wall of the hub. Such a known construction is illustrated in U.S. Pat. No. 3,779,835.

Currently preferred tire manufacturing techniques are served best by radial collapse type drums, particularly where the manufacturing technique involves the use of partly preformed carcases, that is to say bands of plys, which must be threaded over the collapsed drum, the drum then being expanded within the partially preformed carcass. However, while the radial collapse tire of drum is now preferred for many tire building applications, the majority of tire building installations were designed for use with rotary collapse drums, and unless extensive modification of the apparatus for supporting and driving the drum is undertaken the radial collapse drum cannot be substituted for the rotary collapse drum because of the very significant difference in the manner in which drive is transmitted to the collapsing mechanism of the drum.

BRIEF SUMMARY OF THE INVENTION

It is an object of the present invention to provide a radial collapse tire building drum wherein the aforementioned disadvantages are minimized.

A radial collapse tire building drum in accordance with the present invention comprises a hub, a plurality of axially extending cylindrical body segments disposed around the hub, first radial support means at one axial end of the hub and supporting one axial end of the segments, second radial support means at the other axial end of the hub, and supporting the other axial ends of the segments, a collapsing mechanism within the drum and disposed between said first and second radial support means, said collapsing mechanism being selectively operable either to move said segments radially outwardly with respect to said hub to form a cylindrical body concentric with the hub, or to move said segments radially inwardly towards the hub to collapse the cylindrical body of the drum, a main drive shaft secured to the hub and having its axis co-extensive with the hub axis, a hollow shaft through which said main drive shaft extends, and, drive transmission means extending between circumferentially adjacent, radially extending supports of said first radial support means, to provide a drive connection between said hollow shaft and said collapsing mechanism for transmitting rotational movement of the hollow shaft relative to the main shaft to operate said collapsing mechanism.

Preferably said drive transmission means includes a gear train.

Conveniently said gear train comprises at least one gear member rotatable about an axis extending parallel to said hub axis, said gear wheel meshing both with gear teeth rotatable with said hollow shaft, and gear teeth rotatable with a component of the collapsing mechanism.

Preferably the gear member, and the gear teeth of the hollow shaft and the component of the collapsing mechanism are spur gears.

Alternatively said gear train comprises at least one gear wheel rotatable about an axis extending radially of the hub axis, said gear wheel meshing both with gear teeth rotatable with said hollow shaft, and gear teeth rotatable with a component of the collapsing mechanism.

Preferably the gear wheel, and the gear teeth of the hollow shaft and the component of the collapsing mechanism are bevel gears.

Alternatively said drive transmission means includes at least one drive pin extending axially between the collapsing mechanism and said hollow shaft, and passing through a circumferentially extending aperture in the hub and/or said first radial support means.

BRIEF DESCRIPTION OF THE DRAWINGS

The invention will now be described in detail with reference to the accompanying drawings wherein.

DETAILED DESCRIPTION

Figure 1:
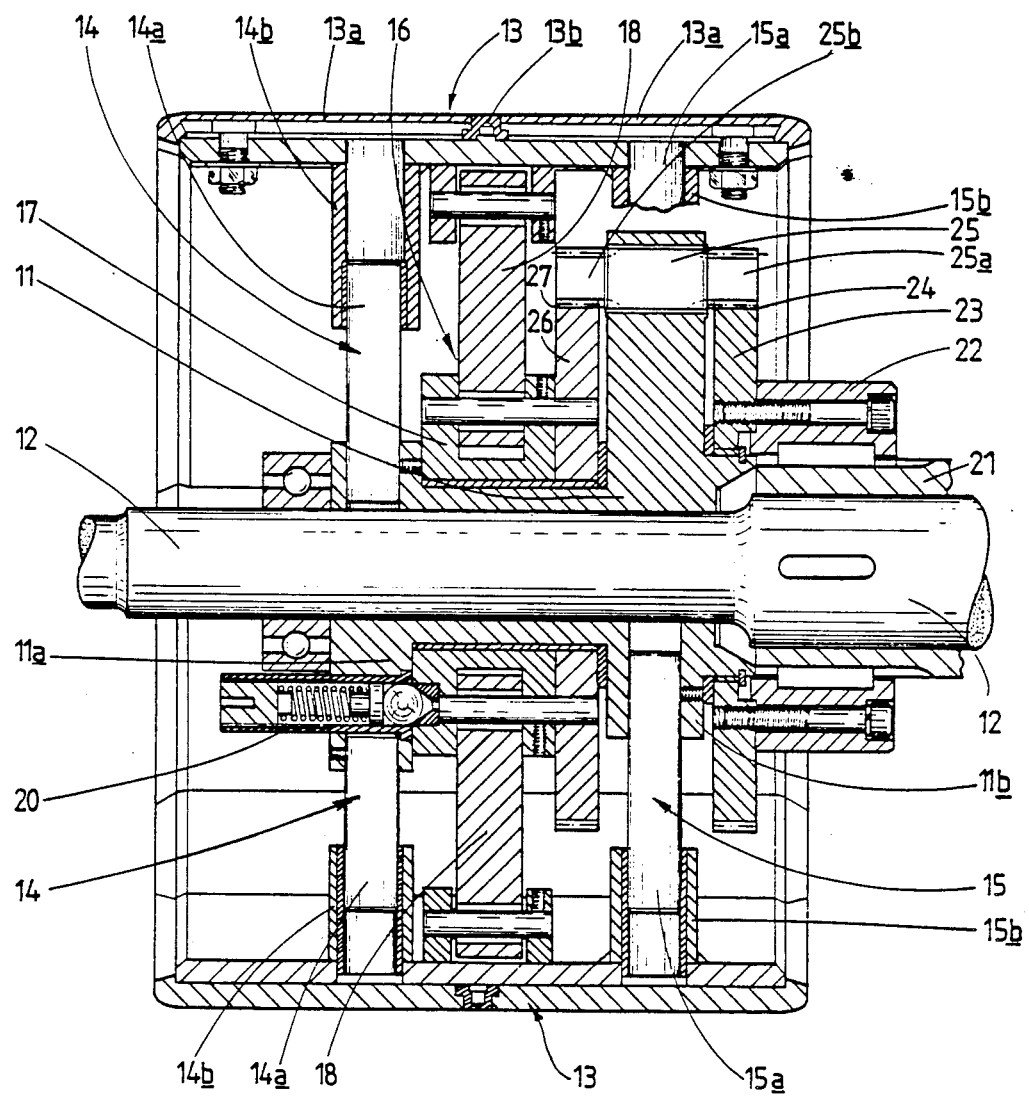
FIG. 1 is a cross sectional view of a tire building drum in accordance with a first example of the invention.
Figure 2:
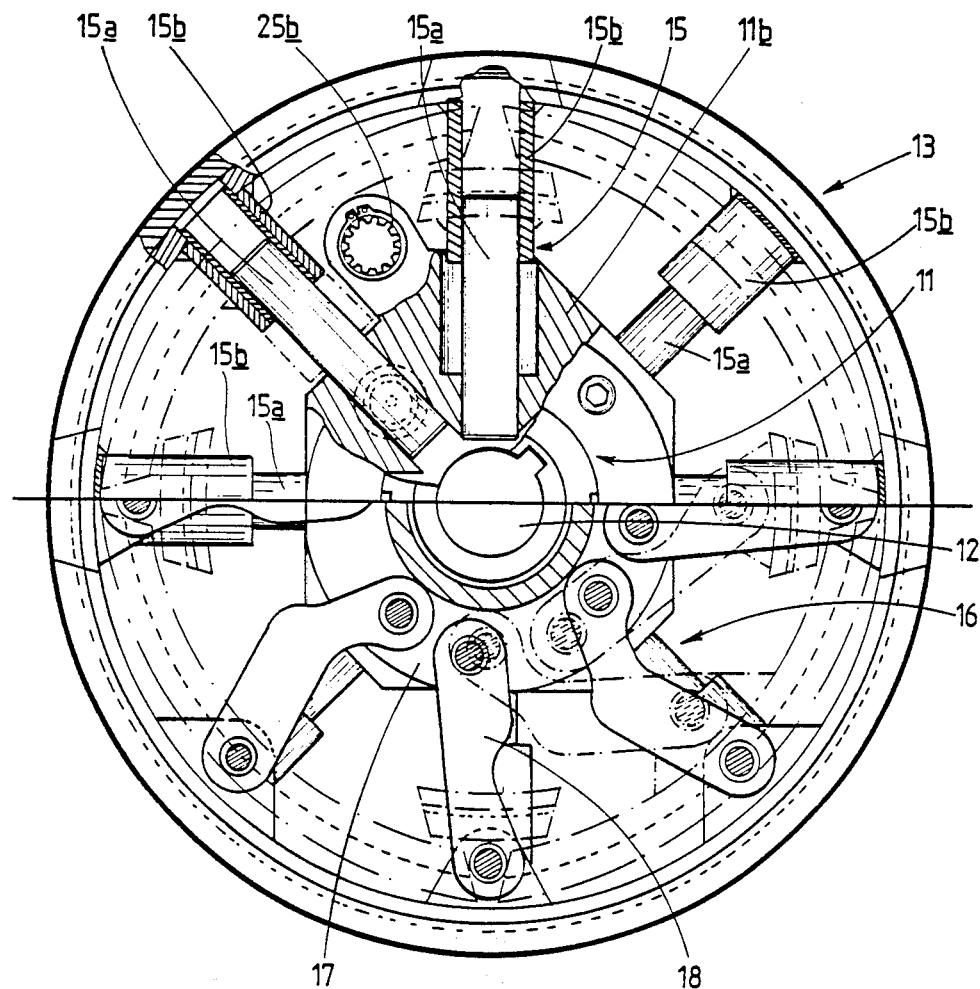
FIG. 2 is a composite view showing in its upper and lower halves respectively transverse cross sectional views at two different points along the length of the drum shown in FIG. 1.

Referring first to FIGS. 1 and 2, the radial collapse tire building drum is of generally conventional construction insofar as it includes a hub 11, secured to a main drive shaft 12 with the axes of the hub 11 and drive shaft 12 co-extensive. The cylindrical body 13 of the drum comprises a plurality of axially extending segments 13a supported at one axial end by a radial support structure 14 and at its opposite axial end by a radial support structure 15. The radial support structures 14, 15 are similar to one another, and each comprises, for each segment, a rod 14a, 15a secured to and extending radially outwardly from the hub and at its outer end slidably engaging in a radial sleeve 14b, 15b secured to and extending inwardly from the segment. In order to provide adequate strength and accuracy in the mounting of the rods 14a, 15a of the support mechanisms 14, 15 the hub is formed at its opposite axial ends with enlarged hub portions 11a, 11b, respectively, within cylindrical recesses of which the ends of the rods are secured by dog-point screws or the like. Encircling the hub 11 between the portions 11a, 11b is a collapsing mechanism 16 comprising a sleeve 17 mounted for rotation on the hub 11 and a linkage arrangement 18 whereby the sleeve 17 is coupled to each of the segments of the body 13. Rotation of the sleeve 17 in one direction on the hub 11 causes the segments of the body 13 to collapse radially inwardly as permitted by sliding movement of the radial sleeves 14b, 15b on the radial rods 14a,15a, whereas rotational movement of the sleeve 17 in the opposite direction on the hub 11 causes the collapsed body segments to move radially outwardly to an expanded position in which the segments define a cylindrical body and in which position the mechanism is retained by a spring operated detent or poppet assembly 20. As is conventional, the body segments can carry respective shell segments 13a which define the outer working surface of the cylindrical body, and which may, if desired, be axially adjustable. In an axially adjustable version alternative, segmented, spacer rings 13b fill the gap between the innermost axial ends of the shell segments, the spacer rings being located accurately by engagement with a circumferential rib integral with the body segments.

The construction described briefly above will be well understood by the expert in the art, and differs from known constructions inter alia in that the hub 11 is not formed with a through bore containing a collapsing mechanism drive shaft. In a known arrangement the collapsing mechanism drive shaft will extend through the main drive shaft 12 and the hub 11 and will be coupled to the sleeve 17 by way of a radially directed, circumferentially extending slot in the wall of the hub.

In the arrangement illustrated in the drawing it will be seen that the main drive shaft 12 is solid. The sleeve 17 of the collapsing mechanism 16 is driven from an external "collapsing drive" quill shaft 21 which is hollow, and through which part of the main drive shaft 12 extends. The hollow quill shaft 21 is coaxial with the main drive shaft 12 and is journalled for rotation thereon. The hollow shaft 21 extends into the drum, and at its innermost end is keyed to a concentric adaptor 22 having secured thereto a radially outwardly extending circular flange 23 having spur gear teeth 24 on its periphery. The gear teeth 24 of the flange 23 mesh with the teeth of a spur gear wheel 25a formed at one end of a gear shaft 25 mounted in the hub portions 11b for rotation about an axis parallel to that of the hub. The shaft 25 is located between circumferentially adjacent radially extending rods 15a of the radial support mechanism 15.

Secured to one axial end of the sleeve 17 is an annular plate 26 journalled for rotation with the sleeve 17 on the hub 11. On its outer periphery the plate 26 is formed with spur gear teeth 27 which mesh with the teeth of the spur gear 25b formed at the opposite end of the shaft 25 from the gear 25a. It will be recognized therefore that when the hollow shaft 21 is rotated relative to the hub 11 and main drive shaft 12 the gear 25a will be caused to rotate and with it will rotate shaft 25 and gear 25b thus rotating plate 26. Since the plate 26 is rigidly secured to the sleeve 17 then the sleeve 17 will rotate relative to the hub 27. Thus the collapsing mechanism 16 can be operated by rotation of the shaft 21 relative to the shaft 12 and hub 11.

In practice the hub portion 11b may carry a pair of gear shafts 25 positioned diametrically opposite one another on opposite sides of the hub axis, the gears 25a, 25b simultaneously meshing respectively with the teeth of the flange 23 and the teeth of the plate 26. Thus the transmission of drive between the shaft 21 and the sleeve 18 will be shared between a pair of gear shafts 25.

The shaft 21 may, if desired, be coupled to a brake drum whereby when the tire building drum is being rotated by the shaft 12, braking force may be applied to the tire building drum by means of the brake drum, and in addition to braking the rotation of the tire building drum, the application of brake force to the brake drum will cause collapsing movement of the sleeve 17 thus generating radial collapse of the body segments. Such an arrangement is of course known in rotary collapse drums many of which employ a similar external hollow shaft to transmit the drive for collapsing and expanding the drum to the collapsing mechanism. It will be recognized therefore that a radial collapse tire building drum of the type described above may be substituted for an existing rotary collapse drum without modification to the ancillary driving and supporting arrangement of the drum.

Figure 3:
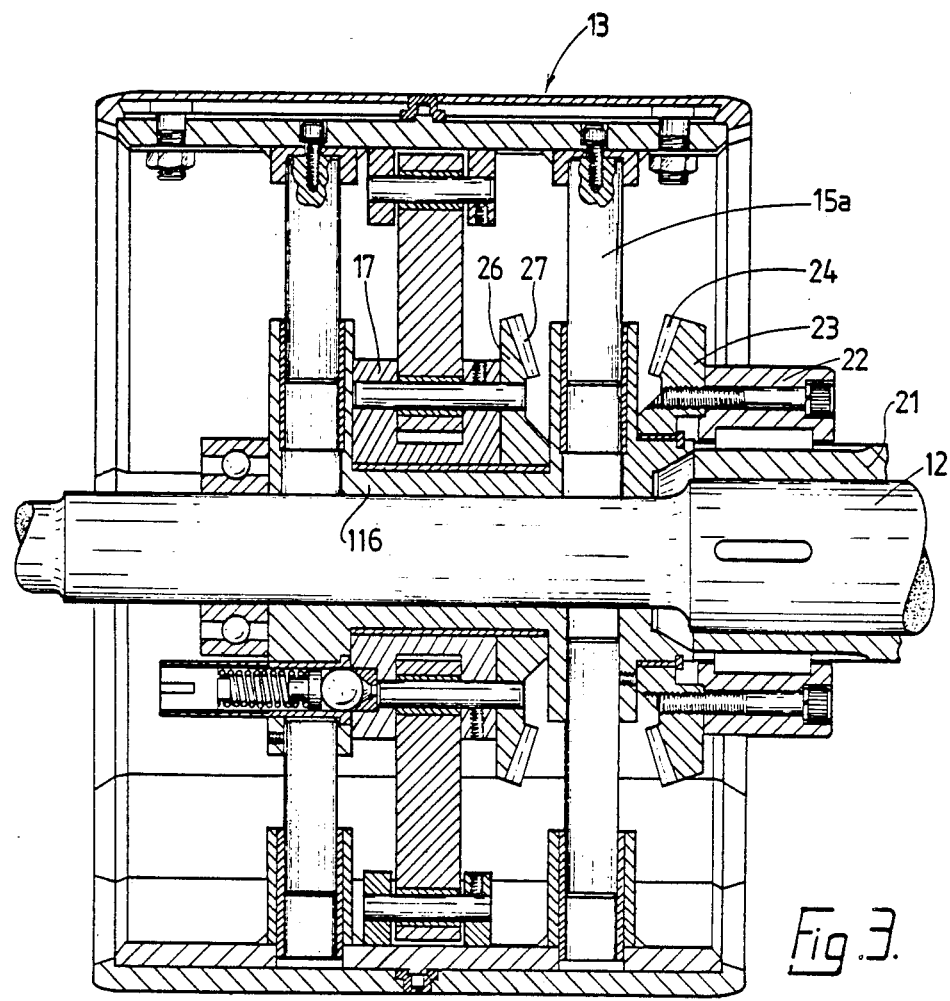
FIG. 3 is a view similar to FIG. 1 of a drum in accordance with a second embodiment of the invention.
Figure 4:
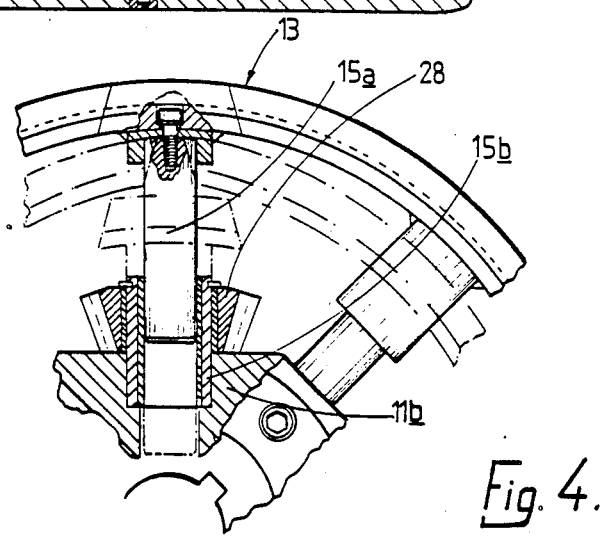
FIG. 4 is a transverse cross sectional view of part of the drum of FIG. 3.

The construction illustrated in FIGS. 3 and 4 is fundamentally similar to that of FIGS. 1 and 2 but differs in that in place of the spur gear arrangement to transmit rotary motion of the shaft 21 to the sleeve 17 there is shown a bevel gear arrangement. Thus the flange 23 and the plate 26 have bevel gear teeth 24, 27 at their peripheries and the hub portion 11b supports a bevel gear 28 for rotation about a radially extending axis. The bevel gear 28 can, as shown, be rotatably mounted about one of the radial support rods 15a of the radial support structure 15.

It will be seen therefore that operation of the drum shown in FIG. 3 and 4 is similar to that described with reference to FIGS. 1 and 2 and more than one bevel gear 28 can be provided if desired. It will be noted that the upper half of FIG. 3 illustrates an arrangement of rods 15a and sleeves 15b different to that of FIGS. 1 and 2 in that the rods are affixed by bolts to, and extend radially inwardly from the segments of the body 13 and are slidably received in sleeves 15b affixed to the hub 11. Thus the or each bevel gear is journalled for rotation on a respective sleeve 15b. For many applications the arrangement of rods and sleeves shown in FIGS. 1 and 2 is preferred. It will be recognized that there is a number of different ways in which the rods can be secured to the hub or body segments.

Figure 5:
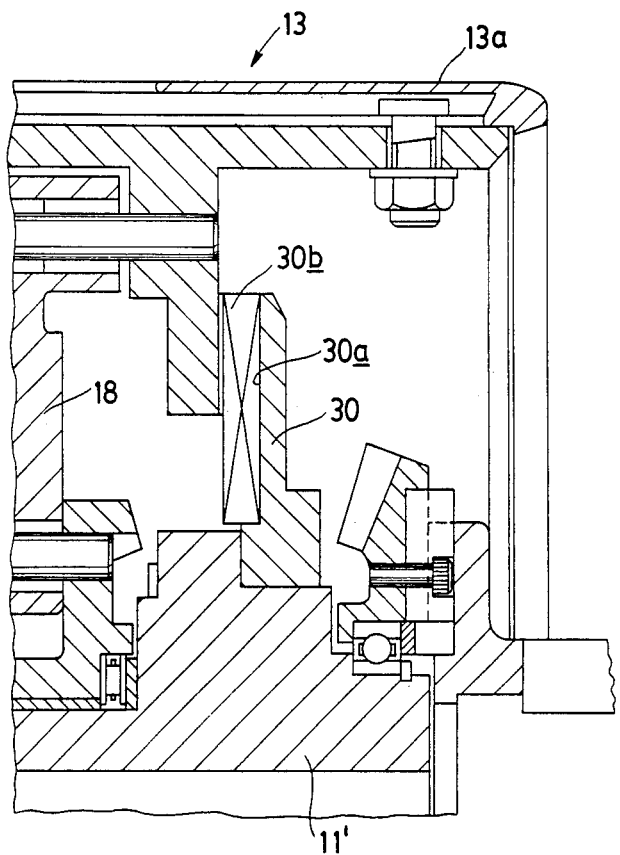
FIG. 5 is a partial cross sectional view similar to FIG. 3 of a further embodiment of the invention.

In a further modification of the arrangement described above the drive for collapsing and expanding the drum is transmitted from the hollow external shaft 21 to the sleeve 17 by one or more axially extending drive pins. The or each drive pin extends generally parallel to the axis of the shaft 12 and hub 11, and is fixed at one end to a flange or radial arm carried by the hollow external shaft 21. At its opposite axial end the or each drive pin is secured to a flange or radially extending arm carried by the sleeve 17, and thus again rotational movement of the shaft 21 will be transmitted to the sleeve 17. The or each axially extending drive pin will pass through the radial support mechanisms 15 either by passing between a circumferentially adjacent pair of radial support rods, or by passing through a passage provided in the hub 11b. Where the pin passes between circumferentially adjacent radial support rods then the positioning of the pin will be chosen such that there is sufficient circumferential clearance between the pin and the rods to accommodate the necessary travel of the pin to achieve the full operating movement of the collapsing mechanism 16. Similarly where the pin passes through a circumferential slot in the hub portion 11b then it will of course be necessary to ensure that the circumferential length of the slot is sufficient to accommodate the necessary movement to achieve the full operating stroke of the collapsing mechanism 16. In a further modification, see FIG. 5, of the arrangements described above, the rods and guides of the support structures 14, 15 are replaced by circular end plates 30 integral with, or secured to the hub 11' and having in their axially inwardly presented faces radially extending guide grooves 30a. Each of the drum segments is formed at its axial ends with a key 30b slidably received in the radial guide groove of the respective plate 30. Preferably the guide grooves are of dove-tail form and the keys at each end of the body segments are of corresponding form. In such an arrangement the end plate 30 taking the place of the radial support structure 15 described above will have apertures therein between the guide grooves 30a for receiving either axial drive pins, or for rotatably supporting gear wheels similar to the gear wheels 25a, 25b or 28 described above, whereby the drive can be transmitted between the radially extending supports defined in part by the guide grooves.

Although not described above it will be recognized that the structure will include the usual finger stops and abutments on the relatively movable parts whereby relative movement is limited to define accurately the relative positions of the parts in the expanded condition of the drum.

We claim:

1. A radial collapse tire building drum comprising:
a hub;
a plurality of axially extending cylindrical body segments disposed around the hub;
first radial support means at one axial end of the hub and including a radially extending support adjacent one axial end of each of the segments;
second radial support means at the other axial end of said hub and including a radially extending support adjacent the other axial end of each of the segments;
a collapsing mechanism within the drum and disposed between said first and second radial support means, said collapsing mechanism being selectively operable either to move said segments radially outwardly with respect to said hub to form a cylindrical body concentric with said hub, or to move said segments radially inwardly towards said hub to collapse the cylindrical body of the drum;
a main drive shaft secured to said hub and having its axis co-extensive with the hub axis;
a hollow shaft through which said main drive shaft extends; and
a drive transmission gear train extending between circumferentially adjacent, radially extending supports of said first radial support means to provide a drive connection between said hollow shaft and said collapsing mechanism for transmitting rotational movement of said hollow shaft relative to the main shaft to operate said collapsing mechanism.

2. A drum as claimed in claim 1 wherein:
said gear train comprises at least one gear member rotatable about an axis extending parallel to said hub axis, said gear member meshing both with gear teeth rotatable with said hollow shaft and gear teeth rotatable with a component of said collapsing mechanism.

3. A drum as claimed in claim 2 wherein:
said gear member, and said gear teeth rotatable with said hollow shaft and the component of the collapsing mechanism are spur gears.

4. A drum as claimed in claim 1 wherein:
said gear train comprises at least one gear wheel rotatable about an axis extending radially of the hub axis, said gear wheel meshing both with gear teeth rotatable with said hollow shaft, and gear teeth rotatable with a component of said collapsing mechanism.

5. A drum as claimed in claim 4 wherein:
said gear wheel, and said gear teeth rotatable with said hollow shaft and the component of the collapsing mechanism are bevel gears.

6. A drum as claimed in claim 1 wherein: said radially extending supports of said first and second radial support means comprise radially extending rods.

7. A drum as claimed in claim 6 wherein: said segments are slidable relative to said rods.

8. A drum as claimed in claim 6 wherein: said rods are slidable relative to said hub.

9. A drum as claimed in claim 1 wherein: said first and second radial support means comprises first and second end plates and said radially extending supports comprise radially extending guide grooves along which parts secured to said body segments are slidable.

10. A drum as claimed in claim 3 wherein:
said radially extending supports of said first and second radial support means comprise radially extending rods.

11. A drum as claimed in claim 5 wherein:
said radially extending supports of said first and second radial support means comprise radially extending rods.

12. A drum as claimed in claim 3 wherein:
said first and second radial support means comprises first and second end plates and said radially extending support comprise radially extending guide grooves along which parts secured to said body segments are slidable.

13. A drum as claimed in claim 5 wherein:

said first and second radial support means comprises first and second end plates and said radially extending support comprise radially extending guide grooves along which parts secured to said body segments are slidable.

14. A tire building drum as claimed in claim 1 wherein:
said first and second radial support means are mounted on said hub.

15. A drum as claimed in claim 1 wherein:
said collapsing mechanism comprises an inner sleeve member rotatably mounted on said hub.

16. A drum as claimed in claim 1 wherein:
said hollow shaft is at one end of said hub.

17. A tire building drum as claimed in claim 3 wherein:
said first and second radial support means are mounted on said hub.

18. A drum as claimed in claim 17 wherein:
said collapsing mechanism comprises an inner sleeve member rotatably mounted on said hub.

19. A drum as claimed in claim 18 wherein:
said hollow shaft is at one end of said hub.

* * * * *